(12) United States Patent
Issitt

(10) Patent No.: US 6,182,482 B1
(45) Date of Patent: Feb. 6, 2001

(54) TAMPER PROOF LOCK ASSEMBLY AND KEY

(75) Inventor: Nicholas Issitt, Annapolis, MD (US)

(73) Assignee: Aegis Research, Dover, DE (US)

( * ) Notice: Under 35 U.S.C. 154(b), the term of this patent shall be extended for 0 days.

(21) Appl. No.: 09/513,955

(22) Filed: Feb. 28, 2000

Related U.S. Application Data

(63) Continuation-in-part of application No. 08/972,525, filed on Nov. 18, 1997, now Pat. No. 6,082,042.

(51) Int. Cl.[7] .................................................. B65D 55/14
(52) U.S. Cl. .............................. 70/160; 70/344; 70/346; 70/387; 292/116; 292/117; 292/300; 411/349; 411/508; 411/913
(58) Field of Search ............................... 43/58, 121, 124, 43/131; 292/300, 302, 303, DIG. 38, 116, 117, 119; 70/158, 159, 160, 344, 387, 345, 346; 220/326, 322, 324; 411/349, 508, 913; 24/328, 330

(56) References Cited

U.S. PATENT DOCUMENTS

| | | | |
|---|---|---|---|
| 345,337 | * | 7/1886 | Tollner . |
| 845,815 | * | 3/1907 | Pfleger . |
| 1,161,156 | * | 11/1915 | Quintal . |

* cited by examiner

Primary Examiner—Jack W. Lavinder
(74) Attorney, Agent, or Firm—Pyle & Piontek

(57) ABSTRACT

A locking mechanism of the barb type is provided for releasably locking two elements together. One of the elements has two pairs of opposed barbs or hook type resilient members. The barbs or hooks of each pair facing each other and being spaced apart. The other element has a pair of opposed, spaced ledges with downwardly facing surfaces engageable, in a locking relationship, with the barbs. An appropriate size opening is provided in the first element above the opposed pairs of barbs. The opening is a round central portion and a pair of side lobes coextensive with the opposed pairs of barbs. A separate key having a central rotational axis is provided. The key has a handle, an intermediate round portion connected to a working end portion, and generally oval in shape or cross section. The key is insertable in the opening such that the narrow part of the oval portion rests between the pairs of opposed barbs. The key is rotated around its axis in either direction to simultaneously urge both pairs of opposed barbs away from each other and out of engagement with the ledges to unlock the mechanism. The key can be rotated to a central stable position to lock the barbs in an open or unlocked position.

3 Claims, 1 Drawing Sheet

TAMPER PROOF LOCK ASSEMBLY AND KEY

CROSS REFERENCE

Figure 1:
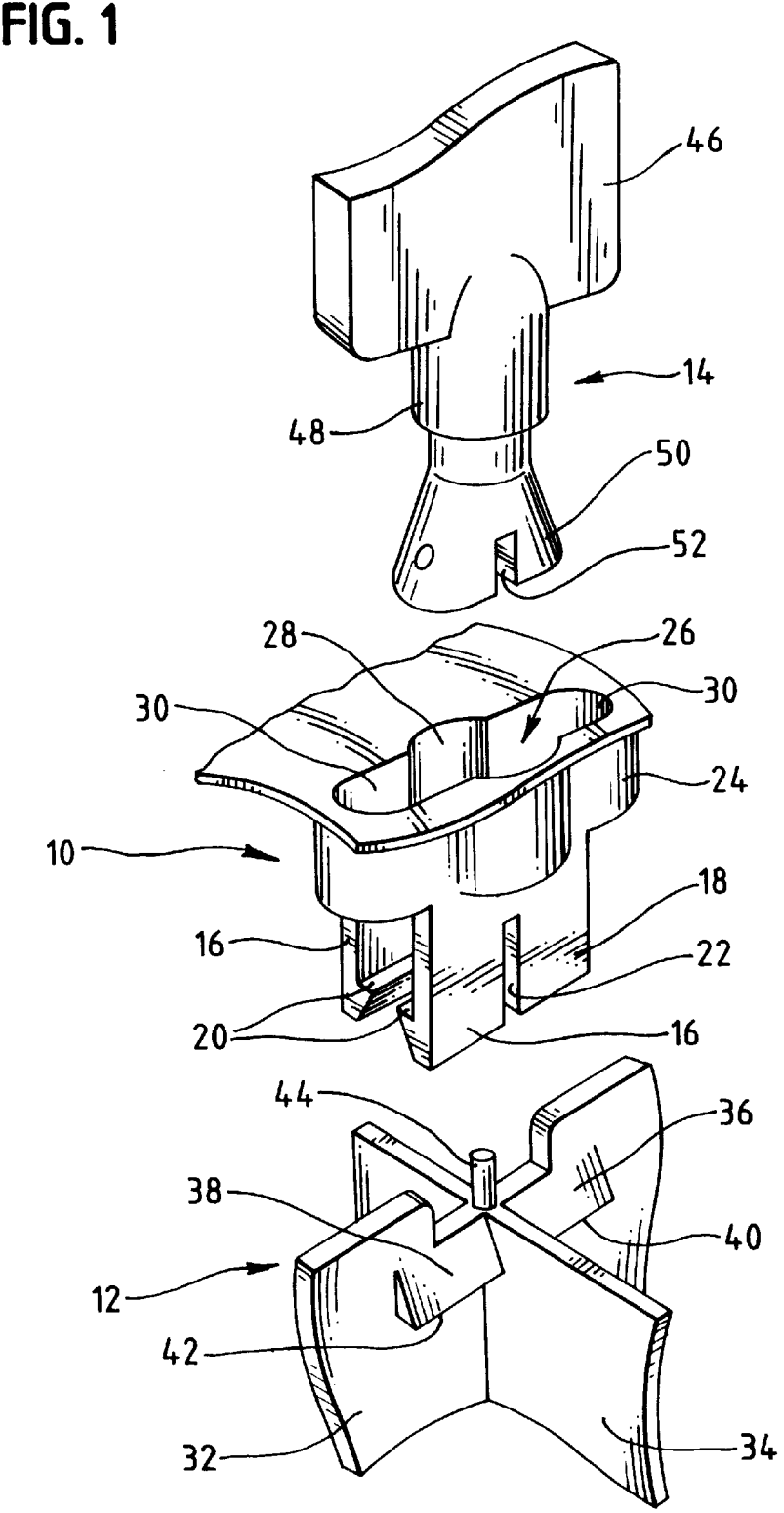

This is a continuation-in part of application Ser. No. 08/972,525, filed Nov. 18, 1997 now U.S. Pat. No. 6,082,042.

BACKGROUND

Many devices made of molded plastics, such as containers with covers, have mating parts which are secured together. Many forms of simple locking devices have been proposed to provide security against tampering by children or other unauthorized people. Ideally, such a locking device should provide security against tampering using ordinary hand tools or probes. One example is a rodent bait station having a removable or hinged cover to allow insertion of poison bait at a feeding position within the interior of the station. Many of these stations are made of molded plastic and include integrally molded locking devices. Such locking devices may each comprise one or more resilient barbs located in the cover and one or more ledges mounted in the base. When the cover is closed, the barbs resiliently snap over the ledges to lock the cover to the base. To release the barbs, a flat key having one or more tines is inserted through an opening in the cover and is used as a lever to pry the barbs away from the ledges. Once the lever is released, the resilient barbs return to a locking position.

SUMMARY OF THE INVENTION

In accordance with the present invention, an improved locking mechanism of the barb type is provided for releasably locking two elements together. One of the elements comprises at least one and preferably two pairs of opposed barbs or hook-like resilient members, with the barbs or hooks of each pair facing each other and being spaced apart.

The other element comprises at least one and preferably a pair of opposed spaced ledges having downwardly facing surfaces engageable with the barbs in a locking relationship.

An appropriate size opening is provided in the first element above the opposed pairs of barbs. The opening preferably comprises a round central portion and a pair of side lobes coextensive with the opposed pairs of barbs.

A separate key having a central rotational axis is provided. The key has a handle, an intermediate round portion connected to a working end portion generally oval in shape or cross section. The key is insertable in the opening such that the narrow part of the oval portion rests between the pairs of opposed barbs. The key is rotated around its axis in either direction to simultaneously urge both pairs of opposed barbs away from each other and out of engagement with the ledges to unlock the mechanism. The key can be rotated to a central stable position to lock the barbs in an open or unlocked position, which is not possible in prior devices of this type.

THE DRAWING

FIG. 1 is a perspective assembly view of the locking device of the present invention.

DETAILED DESCRIPTION

As shown in FIG. 1, the locking device generally comprises a first element, generally shown at 10, a second element, generally shown at 12, and a key 14. The elements 10 and 12 are moveable toward and away from each other in an aligned fashion as shown in the drawing. For example, element 10 may be a integral part of a molded cover, and element 12 may be the molded base of a box or other container, with the cover being hinged to the base to allow movement of the locking elements 10 and 12 into and out of engagement with each other. The two parts need not be held in an axially fixed position relative to each other but may be aligned manually.

As shown, the first portion 10 comprises first 16 and second 18 pairs of opposed inwardly facing resilient barbs having upwardly facing ledges 20. The pairs 16 18 are laterally spaced and have a slot 22 therebetween. The entire locking mechanism are conveniently made of a plastic material, with the thickness of the barbs being designed such that they are resilient and can be moved away from each other.

The fixed ends of the barb pairs 16 and 18 are integral with a base 24 having an external opening 26. The opening 26 extends through the base 24 and preferably comprises a round central portion 28 and a pair of side oval lobes 30.

The second portion or element 12 comprises a first wall or web 32 forming part of the structure of the second portion. The second portion 12 may additionally comprise a second wall or web 34 perpendicular to the first wall 32 in alignment with the slot 22 in the first portion 10.

The first wall or web 32 comprises two sets of opposed pairs (one of each pair is visible) of integral lugs 36 and 38 having downwardly facing ledges 40 and 42. The second portion 12 may additionally comprise an upstarting pin 44 at the juncture of the intersecting webs 32 and 34 to assist with the alignment and rotary motion of the key 14. The pin 4 also prevents tampering with a screwdriver or other tool.

The key 14 comprises a handle 46 and is rotatable about a longitudinal axis like a conventional key. The key 14 additionally comprises a shank having a round portion 48 adjacent to handle 46 and an outwardly flared oval portion 50, which serves as the working portion of the key. As such, the portion 50 has a thickness which is smaller than the width. An open transverse slot 52 may be provided in the oval portion 50 to fit over the pin 44. The dimensions of the round portion 48 and oval portion 50 are slightly less than the dimensions of the opening 26 to allow insertion of the key into the opening.

It may be seen that when the first portion 10 is brought into engagement with the second portion 12, the pairs of barbs 16 and 18 expand over the lugs 38 and 36 until the ledges 20 of the barbs come into locking engagement with the ledges 42–40 of the lugs.

Compared to prior devices, an important advantage of the present arrangement is the improved resistance to tampering. While it is possible to insert an implement such as a screwdriver into the opening 26, the tip of the implement or implements can be only used as a lever to pry away the barbs away from the ledges on one side only, while the barbs on the other side remain engaged due to the pressence of web 32. An additional advantage resides in the fact that one seeking to tamper with the lock would not be aware of the arrangement of the internal mechanism by looking through the opening.

In order to unlock the mechanism, the key 14 is inserted through the opening 26, which will insure that the narrow portion of the oval knob or portion 50 rests between the inner walls of the barb pairs 16 and 18. The key is then rotated around its axis in either rotary direction for 90 degrees, such that the widest portion of the oval knob 50 confront the barbs, forcing them outwardly in a camming type action and out of engagement with the ledges 42–40.

When the key 14 has been rotated to the 90 degrees position, the oval portion 50 detents into the slot 22 between the two sets of prongs 16 and 18, thereby disengaging the opposed prongs of each set and holding the mechanism in an unlocked condition. When the key is returned to the starting position, it may be removed, and the mechanism may be relocked by engaging the elements 10 and 12 as described above.

What is claimed is:

1. A tamper proof lock assembly and key, said assembly comprising first and second elements, said first element comprising a lid, two pairs of laterally spaced resilient barbs depending from said lid, each pair of barbs comprising inwardly facing hooks spaced from each other, and a key opening in said lid above said barbs, said second element comprising a support and opposed ledges on said support lockingly engageable with the hooks of said barbs, said key having a longitudinal axis and first and second ends, a handle at the first end and a barb engaging portion at the second end, said barb engaging portion being insertable into said opening, said key being rotatable about its axis 90 degrees to simultaneously release the two sets of barbs from the ledges, and a slot between the laterally spaced pair of barbs, said key detenting in said slot upon rotation of the key to maintain the assembly in an unlocked position.

2. The assembly and key of claim 1 wherein said barb engaging portion of the key and the opening has a thickness which is smaller than the width.

3. The assembly and key of claim 2 wherein the barb engaging portion of the key is substantially oval in shape.

* * * * *